(12) United States Patent
Foirestier et al.

(10) Patent No.: US 11,407,395 B2
(45) Date of Patent: Aug. 9, 2022

(54) MASTER CYLINDER FOR A BRAKING SYSTEM

(71) Applicant: Robert Bosch GmbH, Stuttgart (DE)

(72) Inventors: Bruno Foirestier, Velennes (FR); Constantin Van De Velde, Brive la Gaillarde (FR); Cyril Pechaud, Le Raincy (FR); Enzo Perini, Vincennes (FR); Jean-Pierre Michon, Le Plessis Belleville (FR); Laurent Lhuillier, Le Blanc Mesnil (FR); Nicolas Quiniou, Villemomble (FR); Thierry Coquart, Fosses (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/950,165

(22) Filed: Nov. 17, 2020

(65) Prior Publication Data

US 2021/0171005 A1     Jun. 10, 2021

(30) Foreign Application Priority Data

Dec. 6, 2019    (FR) ...................................... 1913898

(51) Int. Cl.
  *B60T 11/228* (2006.01)
  *B60T 11/20* (2006.01)
  *B60T 11/232* (2006.01)

(52) U.S. Cl.
  CPC ............. *B60T 11/228* (2013.01); *B60T 11/20* (2013.01); *B60T 11/232* (2013.01)

(58) Field of Classification Search
  CPC ...... B60T 11/228; B60T 11/20; B60T 17/222; B60T 8/38; F16D 2121/04

USPC ........................................................... 60/589
See application file for complete search history.

(56) References Cited

U.S. PATENT DOCUMENTS

| 6,438,955 | B1 | 8/2002 | Chiba et al. |
| 2003/0084665 | A1 | 5/2003 | Hirayama et al. |
| 2005/0231028 | A1 | 10/2005 | Tsubouchi et al. |
| 2009/0195059 | A1* | 8/2009 | Taira ..................... B60T 11/232 303/41 |

FOREIGN PATENT DOCUMENTS

| EP | 219834 A2 | 4/1987 |
| JP | S57194150 A | 11/1982 |
| JP | 2000142365 A | 5/2000 |

* cited by examiner

*Primary Examiner* — Michael Leslie
*Assistant Examiner* — Daniel S Collins
(74) *Attorney, Agent, or Firm* — Norton Rose Fulbright US LLP; Gerard Messina

(57) ABSTRACT

A master cylinder is described. The master cylinder includes a chamber delimited by a piston and supplied from a brake fluid reservoir installed on the top of the master cylinder by an end fitting engaged in a nozzle on the body of the master cylinder. The piston has a nose of reduced section upstream of its skirt guided in the bore hole of the master cylinder and the nozzle is connected to the chamber by a drill hole issuing into the chamber at least partly upstream of the piston in rest position. A valve module is installed in the drill hole to manage communication between the reservoir and the chamber as a function of the position of the piston and the pressure in the chamber with respect to the pressure in the reservoir.

8 Claims, 7 Drawing Sheets

MASTER CYLINDER FOR A BRAKING SYSTEM

CROSS REFERENCE

The present invention claims the benefit under 35 U.S.C. § 119 of France Application No. FR 1913898 filed on Dec. 6, 2019, which is expressly incorporated herein by reference in its entirety.

FIELD

The present invention relates to a master cylinder, including a tandem master cylinder for a vehicle hydraulic braking system, notably an automotive vehicle.

BACKGROUND INFORMATION

The development of hydraulic braking systems primarily involves the active and passive safety means that are intended to be integrated into numerous automotive vehicle projects and which require effective resupply of the master cylinder, which is notably augmented with respect to what conventional master cylinders provide.

Currently, the dual-circuit hydraulic system serves for service braking and emergency braking, but also for autonomous braking.

The service braking system uses a braking force amplifier such as a vacuum amplifier or an electromechanical amplifier, which considerably amplifies the force exercised on the brake pedal by the driver. The two functions, service and emergency, are subject to dimensional, functional characteristics, and regulatory requirements. Such a braking system can be coupled, that is, connecting the driver directly to the braking system, or decoupled, the driver then being connected indirectly to the braking system.

The autonomous braking system is controlled not by the driver but by an electromechanical force amplifier activated by a program and which may or may not be directly connected to the system.

A conventional braking system has at least one central hydraulic unit with an integrated electronic controller and a pump (ESP system) capable of creating pressure during an active braking maneuver independently of the driver. Through its resupply function, the master cylinder is generally the element that supplies the pump.

The tandem master cylinder is equipped with special seals known as cups, which provide the sealing function as well as the resupply function. But this cup design highlights a contradiction between the sealing function and the resupply function, which limits the resupply possibilities. That is why, in its current state, the tandem master cylinder cannot provide the necessary flow rate to the new braking functions under development.

FIG. 8 shows a tandem master cylinder according to the related art, comprising a primary piston and an auxiliary piston, each delimiting a chamber. Each of the chambers is connected to a nozzle 405, 406, receiving the end fittings of the brake fluid reservoir.

The nozzles communicate with the chambers by a respective supply drill hole through a crown of drill holes realized in the skirt of the pistons, near their forward extremity. The leak tightness of the pistons in the bore holes of the master cylinder is realized by seals and cups operating in homologous fashion for the two pistons:
 the seals have a sealing function,
 the cups have a dual function of:
  ensuring leak tightness,
  enabling resupply of the chamber.

FIG. 9 schematically shows the detail of the contact between the piston and the cup, showing how the supply drill hole communicates with the crown of drill holes on the piston skirt, behind the cup when the piston is in rest position.

According to FIGS. 10-13:

At rest (FIG. 10), the chamber communicates with the brake fluid reservoir by the crown of drill holes on the piston and the drill hole on the body of the master cylinder, issuing into a peripheral groove to supply all the piston drill holes.

Then (FIG. 11), the piston advances and causes the drill hole crown to pass beneath the cup, thereby cutting communication with the reservoir and enabling pressurization of the chamber. This pressure is exerted on the cup as well to complete the sealing process.

Then (FIG. 12), the piston continues to advance in order to increase the pressure and send the brake fluid into the brake circuits.

Then (FIG. 13), in the event of a pressure drop in the chamber, the brake fluid is drawn from the reservoir by circumventing the cup in its groove and passing between the bore hole and the piston skirt. But resupply of the chamber is difficult and slow, which is not suitable for current brake circuits.

SUMMARY

An object of the present invention is to provide a master cylinder whose resupply function is substantially improved while the overall size is reduced, and without generating manufacturing costs or difficulties.

The present invention also realizes a tandem master cylinder whose operation, from the driver's point of view, is not altered with respect to the operation of current master cylinders.

In accordance with an example embodiment of the present invention, a master cylinder is provided, notably a tandem master cylinder comprising at least one chamber delimited by a piston, the chamber being connected to the brake circuit and supplied from a brake fluid reservoir installed on the top of the master cylinder by an end fitting on the bottom of the reservoir engaged in a nozzle on the top of the master cylinder body. In the master cylinder:

A) the piston has a nose of reduced section upstream of the piston skirt, guided in the master cylinder bore hole,
 B) the nozzle is connected to the chamber by a drill hole issuing into the chamber at least partly upstream of the piston in rest position and straddling, at least partly, the nose,
 C) a valve module is installed in the drill hole to manage communication between the reservoir and the chamber as a function of the position of the piston and the pressure in the chamber with respect to the pressure in the reservoir.

The master cylinder according to the example embodiment of the present invention may have the advantage of enabling direct communication, practically without pressure loss between the brake fluid reservoir and the chamber to which the reservoir is connected by its end fitting. This communication is controlled very efficiently and simply by the movement of the piston, whose nose passes from rest position to the active position controlling the valve module to, initially, close the valve module and cut communication with the reservoir when the skirt arrives beneath the valve module cam and then, nevertheless, enables efficient resupply through the opening of the valve module in the event of a pressure loss in the chamber. This opening is nearly instantaneous, so that there is no delay in resupply of the chamber, and this resupply occurs without being hampered by pressure losses in the conduits or long, narrow passages, as is the case with known master cylinders.

The present invention enables the elimination of the cup associated with each chamber of the master cylinder, which constitutes a considerable simplification in the realization of the master cylinder and its assembly. This also avoids the risk of reverse positioning of the cups, preventing their normal operation.

Finally, elimination of the cup in the master cylinder allows the master cylinder and the piston, both primary and secondary, to be shortened.

According to an advantageous embodiment of the present invention, the valve module comprises
- a cylindrical body intended to be installed in the master cylinder drill hole and provided
- on the reservoir side, with a valve seat
- on the chamber side, with a travel limit stop and accommodating a float valve
- movable between the seal seat and the stop
- projecting beyond the stop to come into contact with the piston,
- the float valve comprising:
- a check mechanism connected to a cam that comes to rest against the nose or skirt of the piston, the check mechanism cooperating with the valve seat and the cam, being retained in the module housing,
- an elastic connector between the check mechanism and the valve to enable elastic compression of the check mechanism by the pressure applied to it when in its expanded state.

This example embodiment of the valve module is particularly simple and advantageous because the module is realized completely outside the master cylinder so it can be mounted in the assembled state in the master cylinder drill hole.

Adjustment of valve module operation is very simple because this adjustment consists in moving the valve module cam in the bore hole so it can cooperate with the nose of the piston and its skirt. This adjustment is nearly immediate because the valve module is positioned as a stop in the drill hole.

According to another advantageous embodiment of the present invention, the outlet of the drill hole is positioned in the bore hole to issue there while straddling the nose of the piston in rest position, which allows the length of the piston and the master cylinder to be reduced, as previously indicated, and at the same time enables positioning to be automatically realized while benefiting from a maximum amplitude of the float valve between its rest position, leaving communication open and when the cam is resting against the nose of the piston, and the active position, in which the cam is resting against the piston skirt.

According to another advantageous embodiment of the present invention, the elastic connection is realized by the sliding assembly of the check mechanism on the cam and completed by a compression spring between the check mechanism and the valve.

This elastic connection is particularly reliable because it is not very fragile and little subject to material fatigue.

According to another advantageous embodiment of the present invention, the cam has a connecting rod on which the check mechanism slides and the compression spring is fit.

This allows for simple assembly of the cam and the check mechanism.

According to another advantageous embodiment of the present invention, the check mechanism is connected to the axial rod of the cam, the check mechanism having, behind its support surface, a cavity, and the axial rod being engaged, held by its extremity equipped with hooks, in the cavity of the check mechanism head while enabling a relative sliding movement of the check mechanism on the extremity of the rod between a position of maximum extension and a position of limited maximum compression by the extremity of the rod coming to a stop at the back of the cavity.

According to another advantageous embodiment of the present invention, the cam has a domed contact surface, notably in the shape of a spherical cap, to press upon the nose as well as the skirt of the piston.

The rounded contact surface enables a sliding contact between the cam and the moving piston.

According to another example embodiment of the present invention, the cam is surmounted by an edge so that it rests upon the housing stop while allowing the support surface of the cam to project so that it comes into contact with the piston.

BRIEF DESCRIPTION OF THE DRAWINGS

The present invention is described in greater detail below using the example embodiment of a master-cylinder according to the present invention.

DETAILED DESCRIPTION OF EXAMPLE EMBODIMENTS

Figure 1:
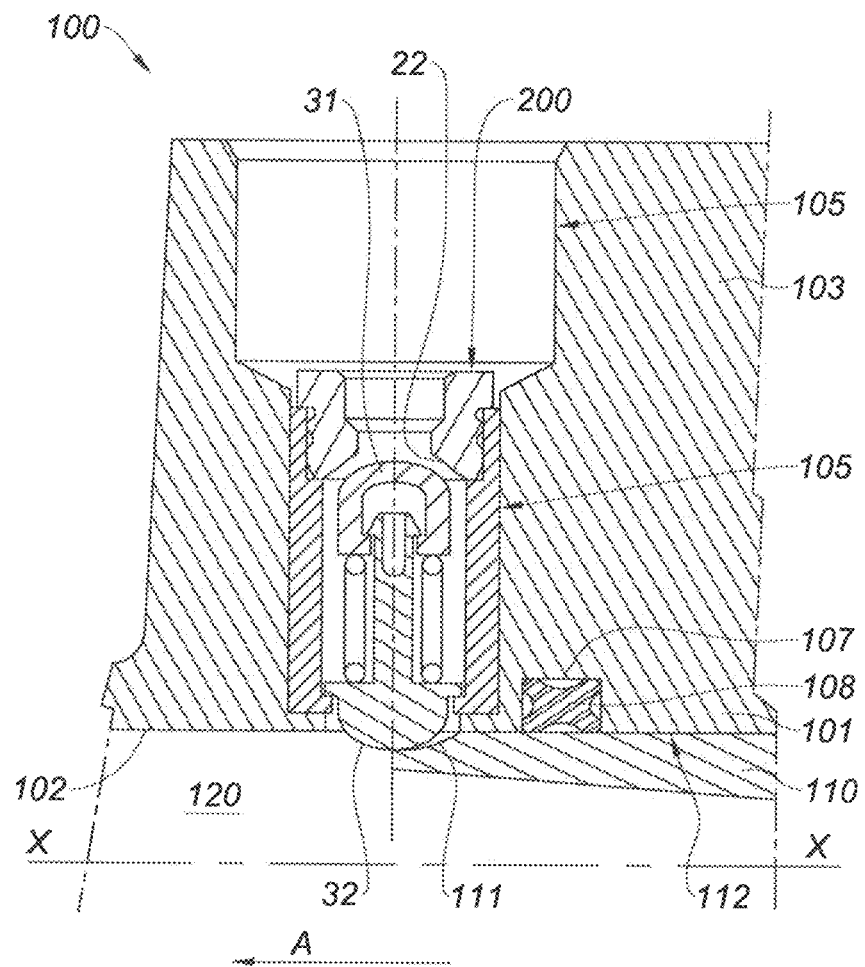
FIG. 1 is an axial section of a portion of the master cylinder limited to the bore hole, to the extremity of a piston and the chamber it delimits, as well as the passage accommodating the end fitting of the brake fluid reservoir, not shown, in accordance with an example embodiment of the present invention.

FIG. 1 shows a cutaway view of a portion of a simple or tandem master cylinder 100 whose body 101 is traversed by bore hole 102 receiving piston 110, which delimits chamber 120 receiving the brake fluid to supply a brake circuit, not shown, in accordance with an example embodiment of the present invention.

Drill hole 105 connecting nozzle 104 receiving the end fitting of the brake fluid reservoir, not shown, issues into chamber 120.

Drill hole 105 is equipped with valve module 200 managing the passage of brake fluid between the reservoir and the chamber based on the position of piston 110 and the pressure found in chamber 120.

By linguistic convention, the pressure/pressure drop found in chamber 120 is the relative pressure, that is, the difference between the absolute pressure in chamber 120 and the pressure in the reservoir, this latter being the atmospheric pressure.

According to the operation of master cylinder/tandem master cylinder 100, there exists in chamber 120 a pressure or a vacuum, no pressure being atmospheric pressure by definition.

It should also be noted that the description of the present invention applies to a tandem master cylinder as well as to a simple master cylinder, the one having two pistons delimiting two chambers, each connected to a brake circuit, and the other having but a single chamber 120.

The operation, described simply for one chamber, applies under the same conditions, to the two chambers of a tandem master cylinder.

Figure 2:
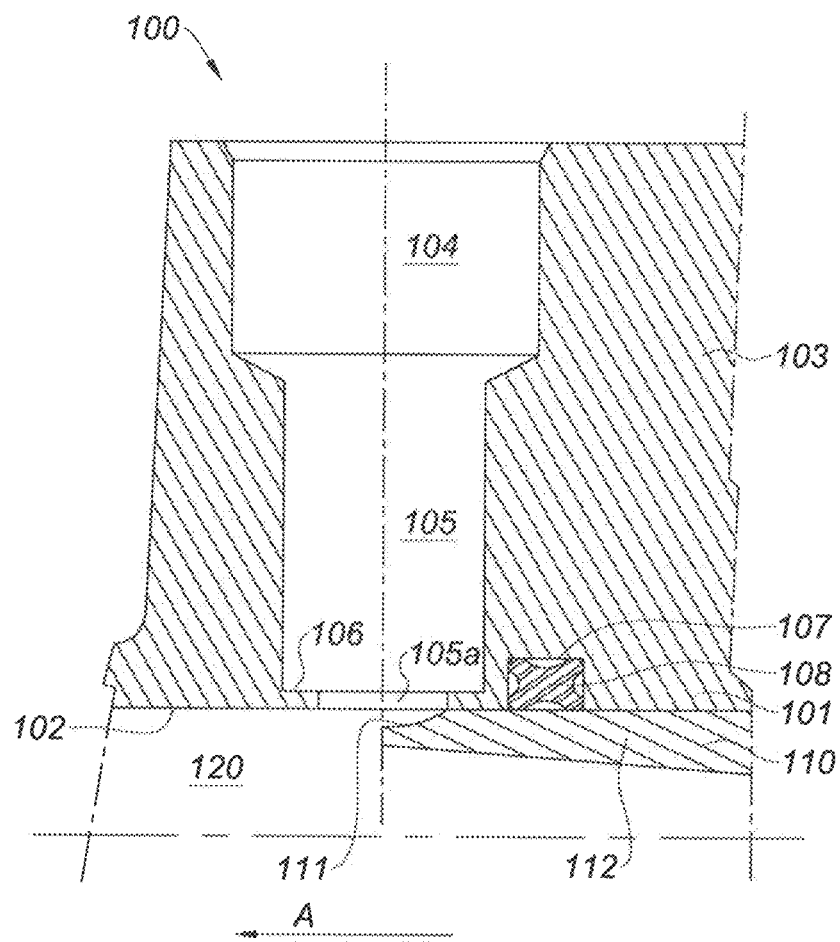
FIG. 2 is an axial section of the passage alone, according to FIG. 1, in accordance with an example embodiment of the present invention.
Figure 2A:
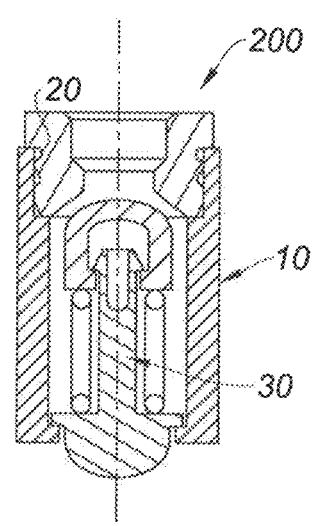
FIG. 2A is an axial section of the float valve housed in the passage, in accordance with an example embodiment of the present invention.

In a more detailed manner, according to FIGS. 2 and 2A, master cylinder 100 according to the example embodiment of the present invention, for the portions represented in cross-section, is composed of body 101 with bore hole 102 accommodating piston 110 (primary piston or secondary piston), shown in rest position. In the active phase, piston 110 advances in direction A. The leak tightness between bore hole 102, and piston 110 is provided by seal 108 housed in peripheral groove 107 of bore hole 102. Seal 108 is situated behind outlet 105a of drill hole 105 of passage 103, bearing the brake fluid reservoir.

Piston 110 has nose 111 of reduced diameter from the nominal diameter of skirt 112 of the body of piston 110. Nose 111 has a straight frustoconical or curvilinear shape.

Drill hole 105 is positioned with respect to piston 110 so that, in rest position, piston 110 partly straddles outlet 105a of drill hole 105 with its nose 111.

Drill hole 105 of passage 103 connected to nozzle 104 forms peripheral shoulder 106 at the junction with bore hole 102 (this shoulder is shown in very simplified fashion and is not geometrically exact). Drill hole 105 communicates with chamber 120 by its outlet 105a, left free by peripheral shoulder 106.

FIG. 2A shows valve module 200, which will be housed in drill hole 105, coming into contact with shoulder 106 so that the active portion, described below, of valve module 200 can project across outlet 105, in contact with nose 111 or skirt 112 of piston 110, depending on the position or movement of the piston.

Valve module 200 consists of housing 10, shaped like a cylindrical body, accommodating sealing seat assembly 20 and accommodating float valve 30.

The presentation of components 10, 20, 30 of valve module 200 will be made by means of FIGS. 3, 3A, 3B, 3C, which are axial sections of valve module 200.

Figure 3A:
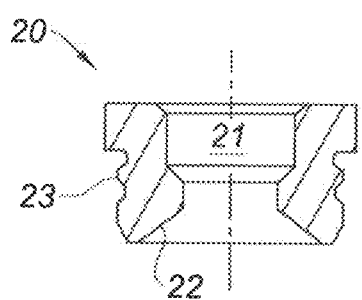
FIG. 3A is an axial section of the seat assembly of the float valve, in accordance with an example embodiment of the present invention
Figure 3:
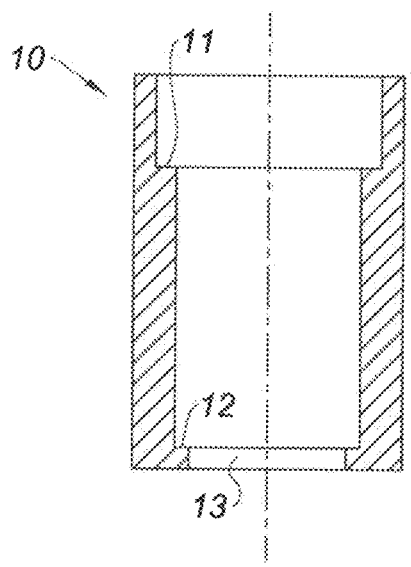
FIG. 3 is an axial section of the housing of the float valve, in accordance with an example embodiment of the present invention.

According to the cutaway view of FIG. 3, housing 10 is a cylindrical sleeve whose outside diameter is suitable for being affixed in drill hole 105 of passage 103. Cylindrical sleeve 10 has, on the top, shoulder 11 to accommodate sealing seat assembly 20 and, on the bottom portion, based on the orientation shown, which is also that when in use, lower stop 12, for example, in the shape of a lip leaving opening 13.

According to FIG. 3A, sealing seat assembly 20 is a piece in the shape of a pierced stopper, equipped with entrance 20, communicating with valve seat 22 on the bottom. Peripheral side 23 of assembly 20 has peripheral ribs to realize the attachment and leak tightness of the assembly in the top of housing 10 (FIG. 2A).

Figures 3B, 3C:
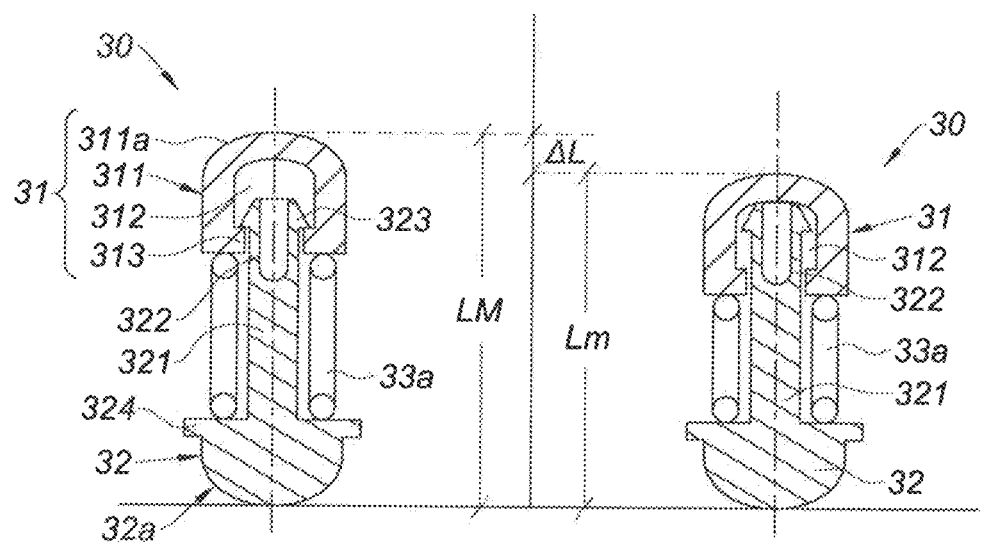
FIG. 3B is an axial section of the float valve in rest position, in accordance with an example embodiment of the present invention.
FIG. 3C is an axial section of the float valve in the compressed state, in accordance with an example embodiment of the present invention.

According to FIG. 3B, float valve 30 consists of, based on the orientation shown, which is also that of operation, check mechanism 31 associated with cam 32, with the interposition of compression spring 33a.

Check mechanism 31 has head 311 whose surface 311a makes contact with valve seat 22 of housing 10 when valve module 200 is in closed position.

Head 311 has cavity 312 equipped with axial orifice 313 traversed by rod 321 of cam 32. Extremity 322 of rod 321 is equipped with retention hooks 323, which, through elastic deformation, are engaged during assembly in orifice 313 to subsequently expand behind this into cavity 312 and retain check mechanism 31 in its extended position or rest position, represented in FIG. 3B, on rod 321.

Cam 32 is crowned by edge 324, which by its dimensions, can come to rest upon stop 12 of housing 10 and retain valve 30 in housing 10.

This rest position has no sealing function, brake fluid can pass through whenever edge 324 of the cam is resting on stop 12.

Surface 32a of cam 32 has a domed shape, for example, the shape of a spherical cap, passes projectingly through opening 13 of housing 10 and also through outlet 105a of drill hole 105 so it can project into bore hole 102 and cooperate with piston 110.

The domed shape of cam 32 and the slope of the conical shape of nose 111 of piston 110 enable the piston to easily push cam 32 and, reciprocally, this enables cam 32 to descend while remaining in contact with piston 110.

Compression spring 33a, interposed between check mechanism 31 and the top of cam 32, around rod 321, places valve 30 at maximum limited extension by hooks 322 of rod 321 of cam 32.

The sliding assembly of check mechanism 31, with respect to cam 32 with interposition of spring 33a, forms an elastic connection. Such an elastic connection 33, enabling elastic compression (that is, with return) between check mechanism 31 and cam 32 could also be realized through elastic deformation of the base of check mechanism 31, its sealing surface 311a remaining rigid. We could even imagine elastic deformation of rod 321 of cam 32. This elastic deformation should occur only in the direction of elastic reduction of the length of float valve 30 from its rest length (LM), itself defined to leave communication between the reservoir and chamber 120 open when master cylinder 100 is in rest position.

FIG. 3B shows the maximum extension LM and, by comparison with FIG. 3C, the minimum extension Lm. The difference in length between these two states is represented by ΔL.

In FIG. 3C, check mechanism 31 completely penetrates extremity 322 of rod 321, which comes to a stop against the back of cavity 312 of check mechanism 31.

The state represented in FIG. 3C is a limit case, whereas the state of FIG. 3B corresponds to float valve 30 at rest, subject to no external constraint.

The function of these two states or, at least, of the rest state and a compressed state of the float valve, will be explained below by mean of the description of the operation of the master cylinder, with the help of FIGS. 4-7.

Figure 4:
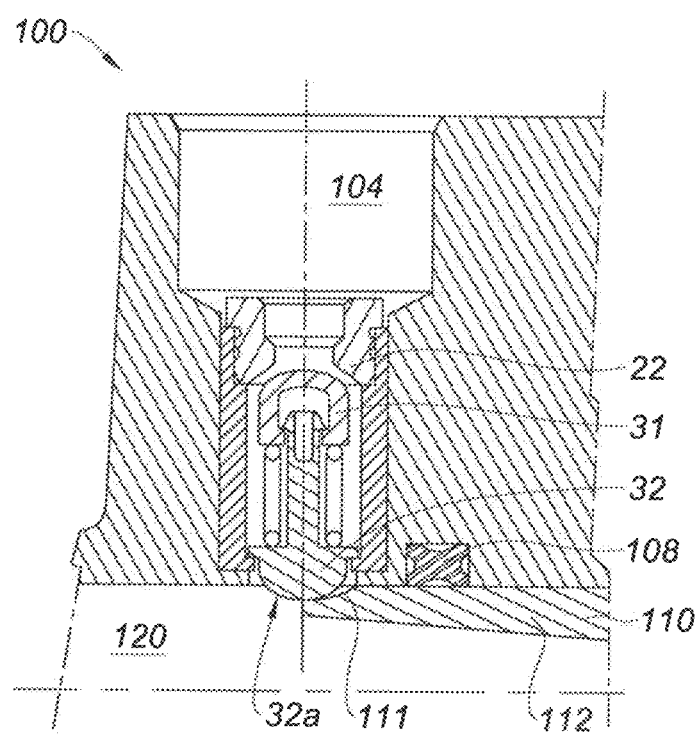
FIG. 4 shows the master cylinder in rest position, in accordance with an example embodiment of the present invention.

FIG. 4 shows the rest state of master cylinder 100: piston 110 is in rest position; it remains withdrawn to the right and straddles opening 105a of drill hole 105 by means of its nose 111.

Float valve 30 is in rest position, with its cam 32 resting on nose 111. Length LM of float valve 30 at rest is such that surface 31 of the head of check mechanism 31 is disengaged from sealing seat 22. Under these conditions, the brake fluid reservoir communicates freely with chamber 120.

Figure 5:
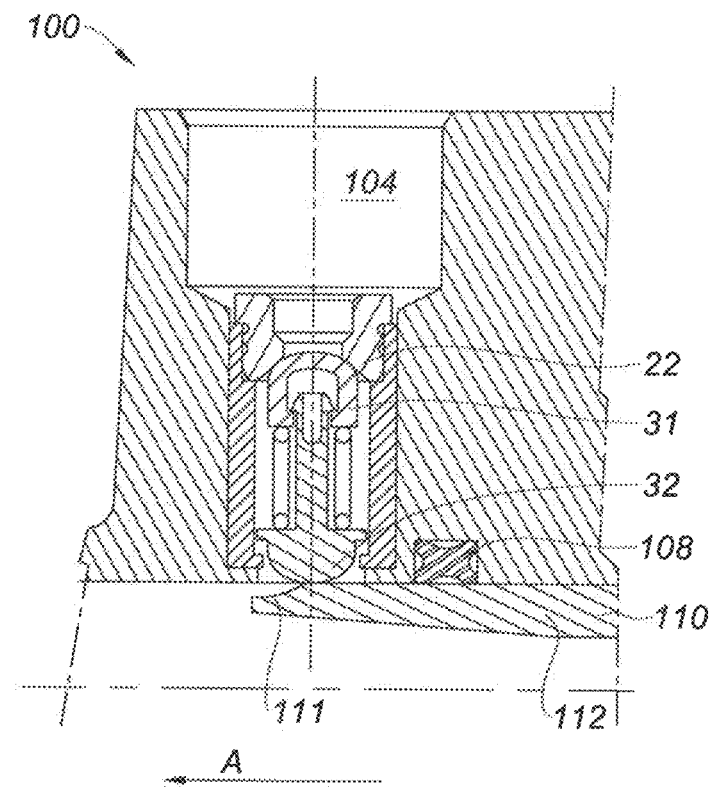
FIG. 5 shows the master cylinder at the start of its action, in accordance with an example embodiment of the present invention.

FIG. 5 shows the action of master cylinder 100. Piston 110 advances (direction A), and its nose 111, then its skirt 112 raise float valve 30 through their contact with cam 32 in such a way that surface 311a of check mechanism 31 is applied against sealing seat 22 and cuts communication between the brake fluid reservoir and chamber 120. This closure results from the length of float valve 30, which, at rest (FIG. 5) when valve 30 is in low position, leaves the passage between seat 22 and check mechanism 31 free, whereas in active position, shown in FIG. 6, raising valve 30 enables closure. In this high position, check mechanism 31 can even be compressed by spring 33a if length LM is greater than the distance then occupied in this position by float valve 30.

Figure 6:
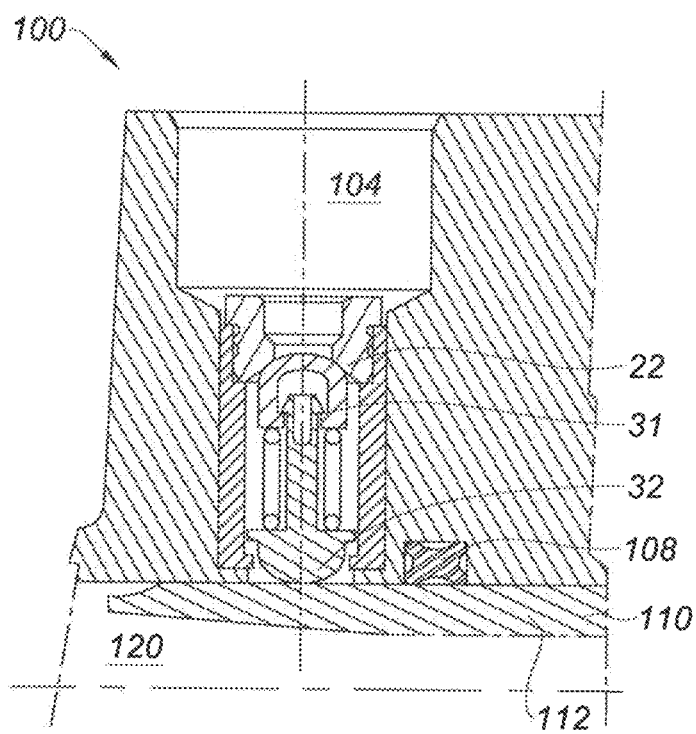
FIG. 6 shows the master cylinder with the brake fluid pressurized in the chamber, in accordance with an example embodiment of the present invention.

According to FIG. 6, piston 110 continues to advance in chamber 120. Pressure is applied to the brake fluid that is found there, including the brake fluid surrounding float valve 30 in housing 10, which applies check mechanism 31 more forcefully against seat 22 and perfectly ensures the seal.

Figure 7:
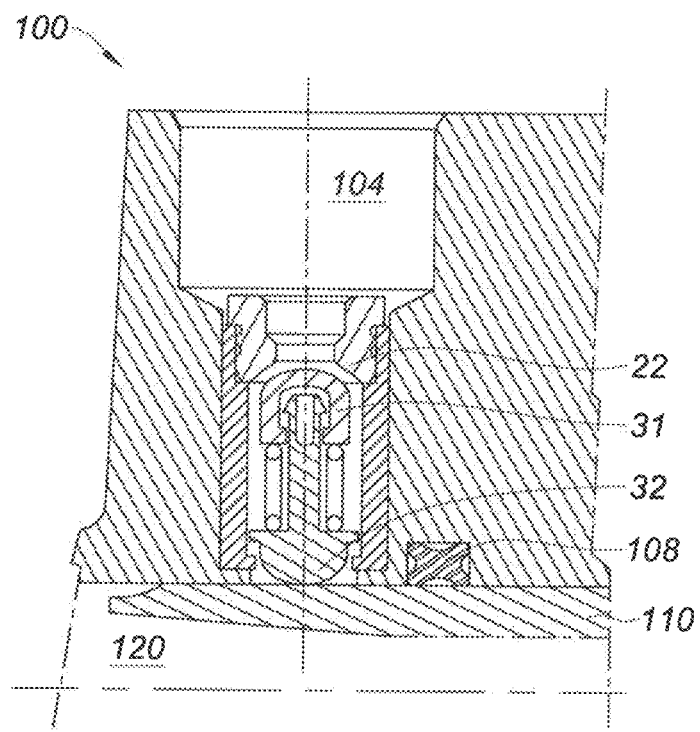
FIG. 7 shows the chamber being depressurized, in accordance with an example embodiment of the present invention
Figure 8:
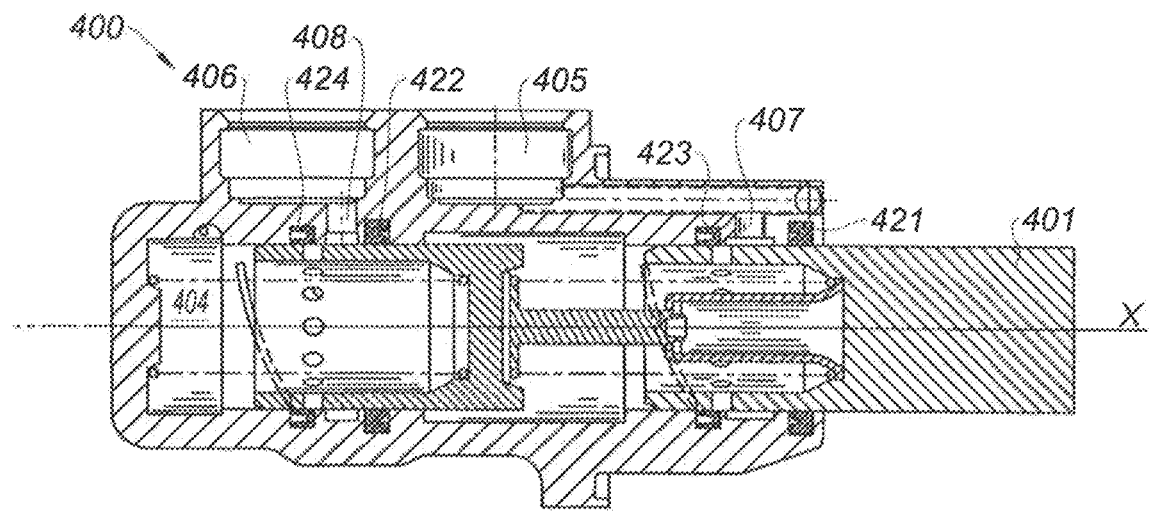
FIG. 8 is an axial section of a tandem master cylinder according to the related art.
Figure 9:
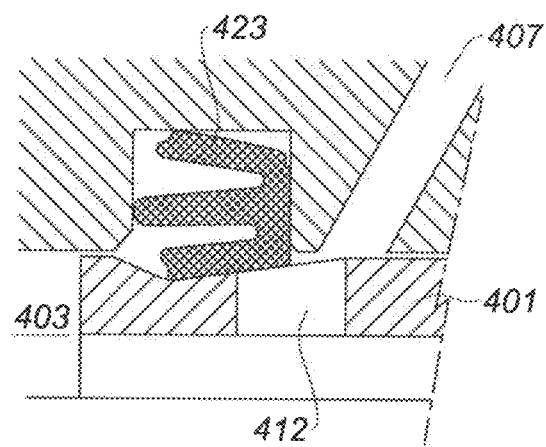
FIG. 9 is an axial section of the tandem master cylinder of FIG. 8 illustrating the detail of a cup.
Figure 10:
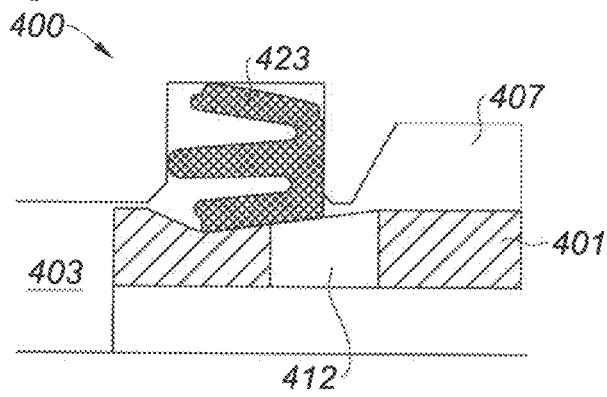
FIGS. 10-13 are different schematic detail views showing the operation of a master cylinder cup.
Figure 11:
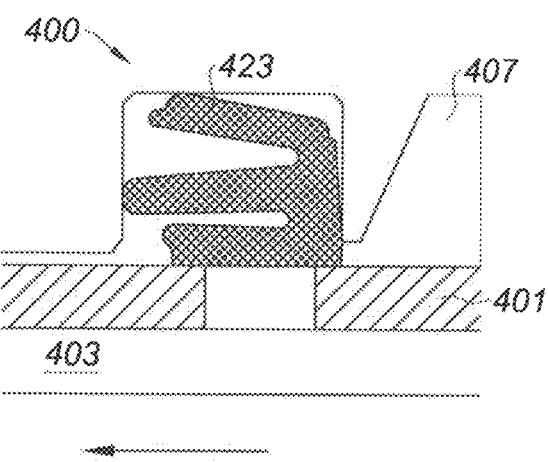
Figure 12:
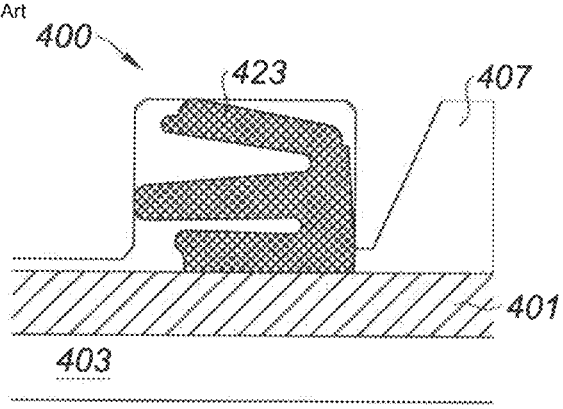
Figure 13:
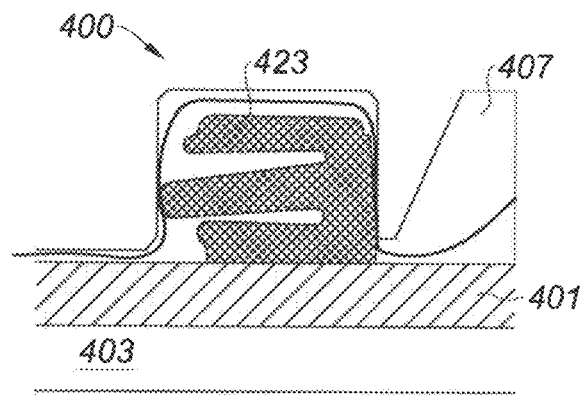

According to FIG. 7, the brake circuit or a slight movement of retraction of piston 110 create a pressure drop in chamber 120, which is felt in valve module 200 and recalls check mechanism 31, drawing off brake fluid to resupply chamber 120.

The passage between the reservoir and chamber 120 is thus cleared and enables immediate resupply of the chamber.

The alternations of pressurization (FIG. 6) and depressurization (FIG. 7) can be repeated during a braking cycle, even with a rapid succession of these alternations and instantaneous response from the float valve for the resupply and operation of the brake system.

At the conclusion of the braking phase, piston 110 is returned to rest position and we return to the state of FIG. 4.

REFERENCE KEY

100 Master cylinder/Tandem master cylinder
101 Master-cylinder body
102 Master cylinder bore hole
103 Passage of master cylinder
104 Nozzle
105 Drill hole
105a Outlet
106 Shoulder
107 Groove
108 Seal
110 Piston
111 Piston nose
112 Piston skirt
120 Chamber
200 Valve module
10 Housing/cylindrical body
11 Seat location
12 Lower stop/limit of travel lip
13 Opening
20 Sealing assembly/sealing seat
21 Entrance
22 Valve seat
23 Peripheral side
30 Float valve
31 Check mechanism
311 Head
311a Head surface
312 Cavity
313 Orifice
32 Cam
32a Cam surface
321 Cam rod
322 Extremity of rod
323 Hooks
324 Edge of cam
33 Elastic connector
33a Compression spring
400 Conventional master cylinder
401 Primary piston
402 Secondary piston
403, 404 Chambers
405, 406 Nozzle
407, 408 Feed drill holes
412, 413 Skirt drill hole crowns
421,422 Seals
423, 424 Cups
A Direction of piston advance

What is claimed is:

1. A master cylinder, comprising:
at least one chamber delimited by a piston, the chamber being connected to the brake circuit and supplied from a brake fluid reservoir installed on top of the master cylinder by an end fitting on a bottom of the reservoir engaged in a nozzle on a top of the master cylinder body, wherein the piston has a nose of reduced cross-section, upstream of a skirt of the piston, guided in a bore hole of the master cylinder, and wherein the nozzle is connected to the chamber by a drill hole issuing into the chamber at least partly upstream of the piston in rest position and straddling at least partly the nose; and
a valve module situated in the drill hole and configured to manage communication between the reservoir and the chamber as a function of the position of the piston and a pressure in the chamber with respect to a pressure in the reservoir, wherein the valve module includes:
a cylindrical body configured to be situated led in the master cylinder drill hole, the cylindrical body provided, on a reservoir side, with a valve seat, on a chamber side, with a travel limit stop, and accommodating a float valve movable between the sealing seat and the stop, the float valve projecting beyond the stop to come into contact with the piston;
wherein the float valve includes:
a check mechanism connected to a cam coming into contact with the nose or the skirt of the piston, the check mechanism cooperating with the valve seat, the cam being retained in a housing of the valve module; and an elastic connector between the check mechanism and the cam configured to enable an elastic compression of the check mechanism by pressure applied, from an expanded state of the elastic connector.

2. The master cylinder according to claim 1, wherein the master cylinder is a tandem master cylinder.

3. The master cylinder according to claim 1, wherein an outlet of the drill hole is positioned in the bore hole to straddle, at least partly, the nose of the piston in a rest position.

4. The master cylinder according to claim 1, wherein the check mechanism is mounted slidingly on the cam, and the elastic connected is realized by a compression spring between the check mechanism and the cam.

5. The master cylinder according to claim 4, wherein the cam has a connecting rod on which slides the check mechanism and on which the compression spring is fit.

6. The master cylinder according to claim 5, wherein the check mechanism is connected to an axial rod of the cam, the check mechanism having a head with a contact surface and behind the head a cavity, the rod being engaged and retained by an extremity of the rod, equipped with hooks, in the cavity while enabling a relative sliding movement of the check mechanism on the extremity of the rod between a position of maximum extension and a position of maximum compression limited by the extremity of the rod coming to a stop against a back of the cavity.

7. The master cylinder according to claim 1, wherein the cam has a domed surface, in a shape of a spherical cap, for application of the cam upon the piston.

8. The master cylinder according to claim 1, wherein the cam is surmounted by an edge to come into contact with the stop of the housing while allowing a support surface of the cam to project to come into contact with the piston.

* * * * *